United States Patent Office 3,446,348
Patented May 27, 1969

3,446,348
PROCESS FOR TREATING CLAY
Paul Sennett and James P. Olivier, Macon, Ga., assignors to Freeport Sulphur Company, New York, N.Y., a corporation of Delaware
No Drawing. Filed Oct. 15, 1965, Ser. No. 496,716
Int. Cl. B03d 1/00
U.S. Cl. 209—5                                    12 Claims

ABSTRACT OF THE DISCLOSURE

Process for varying the titanium content of finely divided titanium-containing ores by adding to an aqueous dispersion of the ore a calcium, barium, strontium or magnesium hydroxide or salt at a specific alkaline pH. In the process, a flocculated ore rich in titanium settles, leaving dispersed an ore of less concentration of titanium than the original finely divided titanium-containing ore.

---

The present invention is concerned with a process for varying the titanium content of finely divided titanium-containing ores and for improving the brightness characteristics of a kaolin clay. More particularly, it relates to a selective flocculation procedure whereby a portion of kaolin clay, rich in discoloring impurities, is caused to flocculate, i.e. to aggregate and settle out, from an aqueous kaolin clay suspension, leaving suspended a purer kaolin clay fraction of improved brightness, as compared with the original kaolin clay.

Typically, kaolin clays comprise a substantial amount of kaolinite and may additionally have varying amounts of such minerals as montmorillonite, halloysite, attapulgite, Fuller's earth, dickite and illite. Pure kaolinite is essentially a white mineral while kaolin clay, as found in nature, and as commercially produced, is discolored. It has long been recognized that this discoloration which reduced the brightness of a kaolin clay can be due to, among other things, the various iron and titanium-containing impurities present in the clay. Titanium dioxide ($TiO_2$), usually in the form of anatase and rutile, is recognized as a discoloring impurity in kaolin; presumably this is because iron in its oxide or other form is incorporated into the crystalline lattice of the anatase and rutile, since pure anatase or rutile is ordinarily a very white substance. As little as 1% of an iron containing material, or less, can suffice to render titanium dioxide highly colored. As used in the application, the term "titanium dioxide" refers to the impure form of anatase and rutile.

Today there is a large commercial interest in improving the brightness of a kaolin clay. In many applications, e.g. paper coating, the value of a kaolin clay depends on its brightness. The brightness of a kaolin clay is conventionally expressed in "GE" values, determined according to TAPPI (Technical Association of the Pulp and Paper Industry) Method T 646 m–54, as reported in the Testing Methods—Recommended Practices—Specifications of the Technical Association of the Pulp and Paper Industry, and is an indication of the amount of iron and titanium-containing impurities present in the clay. For example, chemical analysis of two samples of kaolin clay having GE values of 91.2 and 83.5, respectively, showed the sample with GE value of 91.2 to have approximately $\frac{1}{20}$ the titanium dioxide content of the other sample.

An object of the present invention is to provide a simple and economic process for improving the brightness of a kaolin clay, whether it be a kaolin clay as found in nature, a conventionally processed kaolin clay or a kaolin clay product produced as described, for example, in U.S. Patent 3,171,718 issued Mar. 2, 1965. This patent is assigned to the same assignee as the instant application and its disclosure is incorporated herein.

A further object of the present invention is to improve the brightness of kaolin clay by a simple selective flocculation procedure.

Yet an additional object of the present invention is to vary the titanium content of finely divided titanium-containing ores.

Other objects of the invention will become obvious from the following description and the appended claims.

Most kaolin clays, as found in nature, are flocculated. If a kaolin clay, however, is suspended in water and sufficient dispersant (e.g. tetrasodium pyrophosphate) is added, the kaolin clay and presumably any impurity becomes dispersed. It is common practice in the clay industry to cause total flocculation of a dispersed kaolin clay by the addition of hydrogen ion as supplied, for example, by a mineral acid.

Surprisingly, it has now been found that the titanium content of finely divided titanium-containing ores can be varied by adding to an aqueous dispersion of a finely divided titanium-containing ore, a particular flocculating material at a specific pH range. In the process, a flocculated ore rich in titanium settles, leaving dispersed an ore of less concentration of titanium than the original titanium-containing ore.

The process of the present invention is especially applicable for removing discolored impurities from kaolin clay and, as a result, has found preference in the clay field. It is in direct contrast to a total flocculation procedure whereby a complete separation of the clay takes place. In treating clays a portion of kaolin clay, rich in discoloring impurities, is flocculated from an aqueous kaolin clay suspension containing about 5 to about 70 weight percent of clay solids, preferably from about 10 to 40 weight percent of clay solids. A purer and brighter portion of kaolin clay remains dispersed in the suspension while the flocculated, discolored portion settles out of the aqueous suspension at a fast rate, thus allowing the flocculated discolored portion to be readily separated from the purer dispersed portion.

In a preferred embodiment of the present invention, the discolored kaolin clay starting material is first subjected to a milling operation which can be done in association with fine non-abrasive, resilient grinding media as described, for example, in U.S. Patent 3,171,718, and the delaminated kaolin clay then selectively flocculated according to the present invention.

It is advantageous in the process of the present invention to disperse a kaolin clay or finely divided titanium-containing ore in water with a conventional clay dispersant as sodium silicate, tetrasodium pyrophosphate, sodium hexametaphosphate, sodium tripolyphosphate and the like.

The process of the present invention requires maintaining the pH of the slip (the aqueous slurry) within a specific pH range. There is then added to the slip, salts or hydroxides of magnesium, calcium, barium or strontium, said salts or hydroxides having a water solubility of at least 0.01 gram moles per liter of water at room temperature (ca. 25° C). For effective flocculation it is essential when salts or hydroxides of calcium, barium or strontium are used in the process, that the pH of the slip be maintained at a pH of about 8 to 11, with a preferred pH of 9 to 10. On the other hand, when a magnesium compound is employed, it is usually necessary that the pH of the slip be maintained at a valve of about 8 to 9.5. If necessary, sodium hydroxide or other basic material may be added to obtain the desired pH range.

Examples of suitable salts and hydroxides applicable in the process of the present invention are calcium hydroxide, calcium chloride, calcium acetate, barium chloride, barium acetate, barium hydroxide, strontium chloride, strontinum nitrate, calcium sulfate and magnesium sulfate. Relatively water-insoluble salts such as barium sulfate and strontium sulfate are not suitable.

While the theory behind the present selective flocculation procedure, in connection with a kaolin clay slip, is not entirely understood, it appears that the combination of dispersing agent, a pH of about 8 to 11, and the specifications denoted cause the negative charge of the discoloring particles to be selectively lowered, thereby transforming the discoloring particles from a dispersed state to a flocculated condition. This flocculated condition, which is characterized by the tendency of the particles to group together as agglomerates, results in the discoloring impurities settling out with a portion of the clay at a much faster rate than a remaining purer, brighter fraction of the clay.

A preferred procedure for treating kaolin clay, according to the process of the present invention, is to form initially a kaolin clay slip, i.e. aqueous slurry of the clay. Thereafter, the clay slip, which may be typically slightly acid, is dispersed by violent agitation using a minor percentage of dispersant, e.g. 0.25 weight percent based on dry clay. The slip may then be diluted to a solids content below approximately 12 to 15 weight percent. A slip diluted to 8 to 10 weight percent solids has been found to be particularly suitable to the present process. The pH of the slip is adjusted so as to be in the alkaline pH 8 to 10 range, the base used for the control of pH being any one of the selective alkaline earth hydroxides or salts, or any other base material. The selective alkaline earth compound is then added as a dilute aqueous slurry or solution, with agitation, in small increments until the phenomena of selective flocculation is observed after allowing the slip to stand quiescently for a few minutes. In treating a standard supply of kaolin clay, the necessary amount of alkaline earth compound can be determined for future operations directly. After the flocculated yellow impurity has been allowed to settle, the suspension of white material in the upper layer can be drawn off, or otherwise recovered, then acidified, bleached, filtered and dried, or treated by any other conventional clay recovery steps. The flocculated yellow impurity can be rewashed or reworked according to the process of the present invention, as many times as desired, to obtain a higher recovery of the purer white material.

In general, the amount of dispersant utilized in the process of the invention will be .05 to 0.5, preferably 0.15 to 0.4 percent on a dry ore basis. the amount of magnesium, calcium, barium or strontium salt or hydroxide for the selective flocculation will normally range from about 0.1 to 1.0, preferably 0.2 to 0.6 weight percent based on a dry ore basis. If too little salt or hydroxide is added no efficient flocculation results. On the other hand, too much salt or hydroxide can cause total flocculation of the ore.

As noted previously, the amounts of salts or bases can vary. In general, in connection with kaolin clay, said amounts can be characterized as sufficient to initiate selective flocculation of discoloring impurities in a dispersed clay suspension maintained at the desired pH range.

The following examples are given to aid in understanding the invention. It is to be understood that the invention is not restricted to the specific composition or conditions of application given in the examples. Said examples are illustrative only and should not be construed as limiting the invention which is properly delineated in the appended claims.

Example 1

A sample of a kaolin clay was dispersed in water by the use of about 0.3 weight percent of a mix consisting of about 75 percent tetrasodium pyrophosphate and 25 the weight of the dry clay solids, with a pH of the dispersed clay slip being about 9.1. Upon the addition of calcium acetate, in small increments, selective flocculation was observed, with the separation of the clay slip into two layers; the top layer appeared dispersed and the lower layer appeared flocculated. The material from the upper layer had an unbleached GE brightness of 91.2 while the yellow material from the lower layer had a brightness of 81.2. This compared with the original whole sample which had a GE brightness unbleached of 83.5 when filtered and dried. Chemical analysis showed the light material to have approximately 1/20 the titanium dioxide content of the yellow material.

Example 2

A sample of crude kaolin clay having a GE brightness of 78.8 was dispersed in water with about 0.25 weight percent of tetrasodium pyrophosphate based on the dry percent sodium carbonate, the 0.3 percent being based on clay solids. Thereafter the clay slip was diluted with water to a solids content of about 8 to 10 percent. A calcium hydroxide dispersion was added thereto with agitation to raise the pH of the clay slip to about 8 to 10. The calcium hydroxide slurry was then continually added in small increments with agitation, maintaining the pH of 8–10, until selective flocculation was observed upon allowing the clay slip to stand quiescently for a few minutes. The total amount of calcium hydroxide added was about 0.3 weight percent, based on the dry clay solids.

After the flocculated impurity had been allowed to settle, the upper layer suspension of white material was drawn off. This suspension of white material was acidified by the addition of a mineral acid and the resulting flocculated clay filtered and subjected to a conventional bleaching operation. It was then filtered and dried. A white clay fraction amounting to about 45 percent by weight of the dry clay solids was recovered. A comparison of the GE brightness of the while clay fraction and the initially flocculated impure yellow clay fraction gave the following results:

White clay fraction, GE value _____ 89.3
Yellow clay fraction, GE value _____ 72.2

Example 3

A sample of mine regular-run kaolin clay, having GE brightness of about 81.5 was selectively flocculated, by the procedure set forth in Example 2, to yield 35 percent of a white fraction having a brightness of 91.6.

Example 4

A sample of a bleached, predispersed, plant regular run, kaolin clay having a GE brightness of 84.0 was dispersed in the conventional manner with tetrasodium pyrophosphate and homogenized at 60 percent solids. It was then diluted to a solids content of 8–10 percent and selectively flocculated by the addition of calcium hydroxide at a pH level of about 9. A 54 percent yield of the clay, as a white material, with an unbleached GE brightness of 89.1 was obtained. A 46 percent yield of flocculated yellow clay fraction that remained had an unbleached GE brightness of 81.1.

Example 5

A slurry of bleached, predispersed, plant regular run, kaolin clay of 50 percent solids content, the clays having a GE brightness of about 84.0 was delaminated by agitation, in a drill press unit, in the presence of polystyrene beads. Delamination was effected in the presence of 0.4 percent calcium hydroxide for 30 minutes at a pH of 9. The slip was then screened to remove the polystyrene beads, diluted, and then subjected to selective flocculation by the addition of incremental amounts of calcium hydroxide. A 33 percent yield of white clay having a brightness after bleaching of 91.9 was obtained.

Example 6

A sample of acid Lustra kaolin clay (a top grade of paper coating clay) having a GE brightness of 86.9 was selectively flocculated according to Example 2. A yield of 80 percent of a white kaolin clay having a bleached brightness of 90 was obtained. The flocculated yellow kaolin clay fraction, which amounted to about 20 percent of the original sample, had a bleached brightness of 80.7.

Example 7

A sample of unbleached acid Lustra kaolin clay having a GE brightness of about 86.5 was selectively flocculated, as in Example 6, to give a 50 weight percent yield of a white clay fraction having a bleached brightness of 92.

Example 8

A series of four tests were made to show the effectiveness of calcium acetate, calcium chloride, barium acetate, and barium chloride, as flocculating agents. In each test a sample of unbleached, plant regular run, kaolin clay was dispersed in water with 0.2 weight percent dispersant based on the weight of the dry clay solids. In two of the tests a tetrasodium pyrophosphate dispersant was used; in the third test a sodium silicate dispersant was employed; and in the fourth test a sodium hexametaphosphate dispersant was utilized. In each of the tests the solids content of the dispersion was reduced to about 12.5 weight percent based on the weight of the dry clay solids; the pH of each of the dispersions was adjusted to a value of about 10 with an alkali hydroxide. To one clay dispersion containing the tetrasodium pyrophosphate dispersant, barium acetate (about 0.6 weight percent by weight of the dry clay solids) was added and to the other clay dispersion containing tetrasodium pyrophosphate dispersant, barium chloride (about 0.6–0.65 weight percent by weight of the dry clay solids) was added. To the clay dispersion containing the sodium silicate dispersant, calcium chloride (about 0.2 weight percent by weight of the dry clay solids) was added. To the clay dispersion containing the sodium hexametaphosphate dispersant, calcium acetate (about 0.45 weight percent by weight of the dry clay solids) was added. On standing, the clay slips in each of the dispersions separated into two layers, a dispersed top layer and a flocculated lower layer. Visual observation readily showed that each of the top layers had a whiteness and brightness superior to the flocculated lower layers.

Having described the present invention, that which is sought to be protected is set forth in the following claims. What is claimed is.

1. Process for decreasing the titanium content of kaolin clay which contains a finely divided untreated naturally occurring titanium mineral and thereby increasing its GE brightness which consists essentially of (a) intimately mixing a relatively impure kaolin clay with water and a dispersing agent, selected from the group consisting of sodium silicate, tetrasodium pyrophosphate, sodium hexametaphosphate, sodium tripolyphosphate and a mixture of sodium carbonate and tetrasodium pyrophosphate, to produce an aqueous dispersion of the clay containing the titanium dioxide finely dispersed, the amount of dispersant being about .05 to 0.5 weight percent based on the dry weight of clay, (b) adding to an aqueous dispersion of the clay a flocculating material selected from the group consisting of hydroxides and salts of calcium, barium, strontium and magnesium, the pH of the clay dispersion being maintained at a pH of about 8 to 11 for the addition of a calcium, strontium and barium-containing compound and at a pH of about 8 to 9.5 for the addition of a magnesium-containing compound, said flocculating material having a solubility of at least 0.01 moles per liter of water at room temperature, the amount of salt or hydroxide being about 0.1 to 1.0 weight percent based on the dry weight of clay, (c) agitating the mixture for a period of time sufficient to permit complete and intimate mixing, (d) then allowing the mixture to stand quietly for a period of time sufficient to allow a flocculated kaolin clay rich in titanium to settle from dispersed kaolin clay, (e) separating the dispersed kaolin clay from the flocculated titanium-rich kaolin clay and (f) recovering the kaolin clay of lower titanium content from the dispersion.

2. Process of claim 1 wherein the pH of the dispersion is maintained by the addition of calcium hydroxide.

3. Process of claim 2 wherein the flocculating material is calcium hydroxide.

4. Process of claim 1 wherein the solids content of said dispersion is adjusted to below about 12 to 15 weight percent prior to addition of said flocculating agent.

5. Process of claim 1 wherein the pH of said dispersion is adjusted by the addition of an alkali hydroxide.

6. Process of claim 1 wherein the flocculating material is calcium acetate.

7. Process of claim 1 wherein the flocculating material is calcium chloride.

8. Process of claim 1 wherein the flocculating material is barium acetate.

9. Process of claim 1 wherein the flocculating material is barium chloride.

10. Process for decreasing the titanium content of a delaminated kaolin clay which contains a finely divided untreated naturally occurring titanium mineral and thereby increasing its GE brightness which consists essentially of (a) intimately mixing a relatively impure delaminated kaolin clay with water and a dispersing agent, selected from the group consisting of sodium silicate, tetrasodium pyrophosphate, sodium hexametaphosphate, sodium tripolyphosphate and a mixture of sodium carbonate and tetrasodium pyrophosphate, to produce an aqueous dispersion of the clay containing the titanium dioxide finely dispersed, the amount of dispersant being about .05 to 0.5 weight percent based on the dry weight of clay, (b) adding to an aqueous dispersion of the clay a flocculating material selected from the group consisting of hydroxides and salts of calcium, barium, strontium and magnesium, the pH of the clay dispersion being maintained at a pH of about 8 to 11 for the addition of a calcium, strontium and barium-containing compound and at a pH of about 8 to 9.5 for the addition of a magnesium-containing compound, said flocculating material having a solubility of at least 0.01 mole per liter of water at room temperature, the amount of salt or hydroxide being about 0.1 to 1.0 weight percent based on the dry weight of clay, (c) agitating the mixture for a period of time sufficient to permit complete and intimate mixing, (d) then allowing the mixture to stand quietly for a period of time sufficient to allow a flocculated kaolin clay rich in titanium to settle from dispersed kaolin clay, (e) separating the dispersed kaolin clay from the flocculated titanium-rich kaolin clay and (f) recovering the kaolin clay of lower titanium content from the dispersion.

11. Process of claim 10 wherein the pH range of the dispersion is maintained by the addition of calcium hydroxide.

12. Process of claim 10 wherein the flocculating material is calcium hydroxide.

References Cited

UNITED STATES PATENTS

| Re. 14,583 | 1/1919 | Schwerin | 209—5 |
|---|---|---|---|
| 2,326,592 | 8/1943 | Wicker | 210—42 X |
| 2,626,919 | 2/1953 | Tanner | 23—202 X |
| 2,660,303 | 11/1952 | Haseman | 209—5 |
| 2,981,630 | 4/1961 | Rowland | 106—72 X |

FOREIGN PATENTS

| 106,890 | 6/1917 | Great Britain. |
|---|---|---|
| 370,802 | 5/1939 | Italy. |

HARRY B. THORNTON, *Primary Examiner.*

ROBERT HALPER, *Assistant Examiner.*

U.S. Cl. X.R.

23—110; 106—72

PO-1050
(5/69)

UNITED STATES PATENT OFFICE
CERTIFICATE OF CORRECTION

Patent No. 3,446,348                    Dated June 11, 1969

Inventor(s) Paul Sennett and James P. Olivier

It is certified that error appears in the above-identified patent and that said Letters Patent are hereby corrected as shown below:

Col. 3, line 10, "valve" should be -- value --.

Col. 4, line 14, after "25" insert -- percent sodium carbonate, the 0.3 percent being based on --;
    line 32, after "dry" delete "percent sodium carbonate, the 0.3 percent being based on".

Col. 5, line 43, "dispersion" should be -- dispersions --.

Claim 10, line 56, delete "." after calcium and insert instead -- , --.

Col. 7, change patent "2,626,919" to -- 2,628,919 --; change date of Haseman patent from "11/1952" to -- 11/1953 --

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents